(12) United States Patent  
Matsubara

(10) Patent No.: US 10,614,322 B2  
(45) Date of Patent: Apr. 7, 2020

(54) OBJECT RECOGNITION DEVICE

(71) Applicant: TOYOTA JIDOSHA KABUSHIKI KAISHA, Toyota-shi, Aichi-ken (JP)

(72) Inventor: Toshiyuki Matsubara, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 85 days.

(21) Appl. No.: 15/702,177

(22) Filed: Sep. 12, 2017

(65) Prior Publication Data

US 2018/0005056 A1    Jan. 4, 2018

Related U.S. Application Data

(63) Continuation of application No. 14/005,128, filed as application No. PCT/JP2012/058007 on Mar. 27, 2012, now Pat. No. 9,792,510.

(30) Foreign Application Priority Data

Mar. 28, 2011 (JP) .................................. 2011-069999

(51) Int. Cl.
*G06K 9/00* (2006.01)
*G08G 1/16* (2006.01)

(52) U.S. Cl.
CPC ......... *G06K 9/00805* (2013.01); *G08G 1/166* (2013.01)

(58) Field of Classification Search
CPC ............................ G06K 9/00805; G08G 1/166
See application file for complete search history.

(56) References Cited

U.S. PATENT DOCUMENTS 5,710,565 A * 1/1998 Shirai ................ B60K 31/0008  
340/903  
9,361,591 B2 * 6/2016 Na ......................... G06N 20/00  
(Continued)

FOREIGN PATENT DOCUMENTS

JP    2002-040139 A    2/2002  
JP    2008-026997 A    2/2008  
(Continued)

OTHER PUBLICATIONS

Quadros, A., et al., "An Occlusion-aware Feature for Range Images", 2012 IEEE International Conference on Robotics and Automation, May 18, 2012, 8 pages.

*Primary Examiner* — Gandhi Thirugnanam  
(74) *Attorney, Agent, or Firm* — Hunton Andrews Kurth LLP

(57) ABSTRACT

In an object recognition device, a reliability setting unit sets object presence reliability indicating the reliability of whether or not an object is present with respect to the surrounding area of a host vehicle. Then, a grouping unit groups the reflection points based on the object presence reliability in the area between the reflection points. For this reason, for example, even though two objects are adjacent to each other, in a case where the object presence reliability in the area between the reflection points of one object and the reflection points of the other object is low, the reflection points of the two objects can be separately grouped without being grouped into a single group. As a result, since it is possible to avoid mistakenly recognizing a plurality of objects in a single object, recognition accuracy of the object can be improved.

15 Claims, 6 Drawing Sheets

(56) References Cited

U.S. PATENT DOCUMENTS

| | | | | |
|---|---|---|---|---|
| 9,792,510 B2* | 10/2017 | Matsubara | ......... | G06K 9/00805 |
| 2004/0105573 A1* | 6/2004 | Neumann | ............... | G06T 17/00 |
| | | | | 382/103 |
| 2008/0019567 A1* | 1/2008 | Takagi | ............... | G06K 9/00369 |
| | | | | 382/103 |
| 2008/0176192 A1 | 1/2008 | Takagi et al. | | |
| 2008/0144885 A1* | 6/2008 | Zucherman | ........ | G06K 9/00369 |
| | | | | 382/103 |
| 2010/0034422 A1* | 2/2010 | James | .................... | G06T 7/246 |
| | | | | 382/103 |
| 2010/0104199 A1* | 4/2010 | Zhang | ............... | G06K 9/00798 |
| | | | | 382/199 |
| 2011/0311108 A1* | 12/2011 | Badino | ............. | G06K 9/00805 |
| | | | | 382/106 |
| 2013/0176192 A1* | 7/2013 | Varga | ...................... | G09G 3/04 |
| | | | | 345/7 |
| 2013/0321628 A1* | 12/2013 | Eng | .......................... | B60R 1/00 |
| | | | | 348/148 |
| 2014/0003671 A1* | 1/2014 | Matsubara | ......... | G06K 9/00805 |
| | | | | 382/104 |
| 2014/0236414 A1* | 8/2014 | Droz | ...................... | G08G 1/161 |
| | | | | 701/28 |
| 2015/0293228 A1* | 10/2015 | Retterath | ................ | G01S 17/89 |
| | | | | 356/5.01 |

FOREIGN PATENT DOCUMENTS

| | | |
|---|---|---|
| JP | 2010-040139 A | 2/2010 |
| JP | 2010-096584 A | 4/2010 |
| JP | 2010-191780 A | 9/2010 |

\* cited by examiner

OBJECT RECOGNITION DEVICE

CROSS REFERENCE TO RELATED APPLICATION

This application is a continuation application of U.S. application Ser. No. 14/005,128 filed Sep. 13, 2013, which is a national phase application based on the PCT International Patent Application No. PCT/JP2012/058007 filed on Mar. 27, 2012, and Japanese Patent Application No. 2011-069999, filed on Mar. 28, 2011, the entire contents of each of which are incorporated herein by reference.

TECHNICAL FIELD

The present invention relates to an object recognition device installed in a vehicle.

BACKGROUND ART

As a conventional object recognition device of the above-described technology field, for example, a pedestrian recognition device disclosed in Japanese Unexamined Patent Application Publication No. 2008-26997 is known. The pedestrian recognition device, first, receives a reflected ray when the reflected ray is generated by a reflecting object while radiating a plurality of transmitted rays so as to scan the interior of a detection area. Subsequently, based on the result of the radiation of the transmitted ray and reception of the reflected ray, a coordinate position of the reflecting object is determined. Subsequently, it is determined whether or not the reflecting object is a moving object. Subsequently, in a case where the reflecting object is the moving object, grouping is performed on the reflecting objects which are adjacent to each other in a two-dimensional coordinate system. Then, when a size of a set of the reflecting objects, which is obtained by the grouping, is within a predetermined range, the set of the reflecting objects is recognized as a pedestrian.

CITATION LIST

Patent Literature

[Patent Literature 1] Japanese Unexamined Patent Application Publication No. 2008-26997

SUMMARY OF INVENTION

Technical Problem

The pedestrian recognition device disclosed in Japanese Unexamined Patent Application Publication No. 2008-26997, as described above, aims to improve accuracy of the recognition degree of the pedestrian by grouping the reflecting objects which are adjacent to each other in a two-dimensional coordinate system, in a case where the reflecting object is a moving object. However, in such a pedestrian recognition device, for example, in a case where a plurality of objects are adjacent to each other and move, since the plurality of objects are grouped as a single group, there are some cases where each object may not be able to be correctly recognized.

The present invention is made in view of such circumstances, and an object of the invention is to provide an object recognition device that can improve the accuracy of the recognition of an object.

Solution to Problem

An aspect of the present invention relates to an object recognition device. The object recognition device installed in a vehicle, includes: an object detection unit that detects an object present in the surrounding area of the vehicle; a coordinate specifying unit that specifies coordinates of detection points of the object detected by the object detection unit; a reliability setting unit that sets object presence reliability indicating the reliability regarding whether or not the object is present in the surrounding area based on the coordinates of the detection points specified by the coordinate specifying unit; and a grouping unit that groups the detection points, based on the object presence reliability in the area between the detection points.

In the object recognition device, the reliability setting unit sets the object presence reliability indicating the reliability regarding whether or not an object is present with respect to the surrounding area of the vehicle. Then, the grouping unit groups the detection points, based on the object presence reliability in the area between the detection points. For this reason, for example, even though two objects are adjacent to each other, in a case where the object presence reliability in the area between the detection points of one object and the detection points of the other object is low, the detection points of the two objects can be separately grouped without being grouped into a single group. As a result, since it is possible to avoid mistakenly recognizing a plurality of objects as a single object, recognition accuracy of the object can be improved.

In the object recognition device according to the aspect of the present invention, the reliability setting unit may set the object presence reliability in the area between the object detection unit and the detection points to be lower than the object presence reliability in the detection points. In this case, it is possible to accurately perform the setting of the object presence reliability.

In addition, the object recognition device according to the aspect of the present invention may further include a distribution map creation unit that creates a distribution map of the object presence reliability in the surrounding area based on the object presence reliability which is set by the reliability setting unit, wherein the grouping unit may perform the grouping, based on the distribution map that is created by the distribution map creation unit. According to the configuration, it is possible to easily and reliably perform the grouping of the detection points by using the distribution map of the object presence reliability.

In the above case, the grouping unit may perform the grouping in a region where the object presence reliability in the distribution map is less than a predetermined threshold value, considering that the object is not present. In this case, it is possible to reliably avoid mistakenly recognizing a plurality of object as a single object, and the recognition accuracy of the object can be further improved.

In addition, the object recognition device according to the aspect of the present invention may further include a shape estimation unit that estimates a shape of the object in the area in which the object presence reliability is equal to or greater than a predetermined threshold value, based on the coordinates of the detection points grouped by the grouping unit. According to the configuration, it is possible to easily perform the object recognition based on the estimated shape.

In addition, in the object recognition device according to the aspect of the present invention, the object detection unit may include a transmission unit that transmits laser rays to the surrounding area and a reception unit that receives reflected rays of the laser rays transmitted from the transmission unit, wherein the detection points may be the reflection points of the laser rays.

The object recognition device according to the aspect of the present invention may further include a point-to-point distance measurement unit that measures a point-to-point distance between the two detection points which are adjacent to each other, based on the object presence reliability in the area between the detection points, wherein the grouping unit may group the detection points in which the point-to-point distance is equal to or less than a predetermined distance into a single group.

Advantageous Effects of Invention

According to the present invention, it is possible to provide an object recognition device that can improve the accuracy of the recognition of an object.

DESCRIPTION OF EMBODIMENTS

Figure 1:
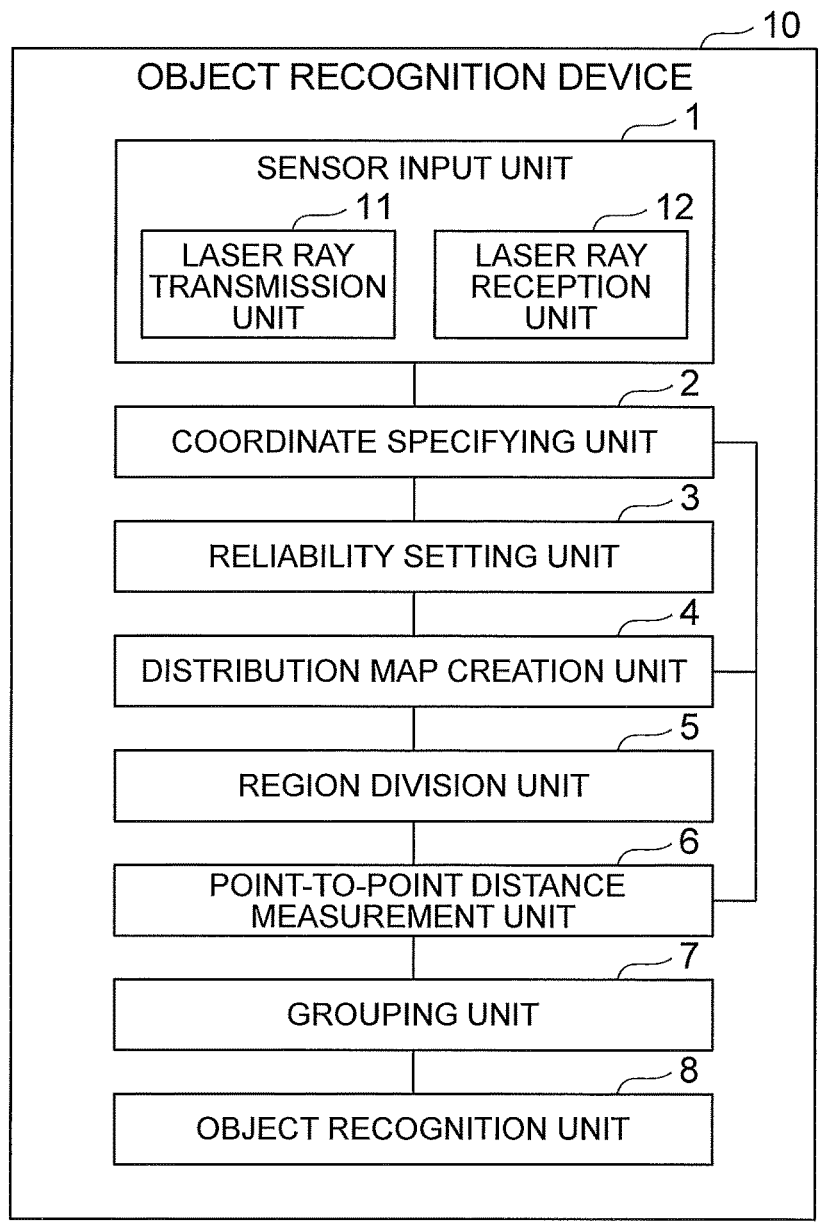
FIG. 1 is a block diagram illustrating a configuration of an embodiment of an object recognition device according to one aspect of the present invention.

Hereinafter, an embodiment of an object recognition device according to one aspect of the present invention will be described in detail with reference to the drawings. Moreover, in the description of the drawings, the same reference numerals will be given to the same elements, and overlapped descriptions will be omitted.

FIG. 1 is a block diagram illustrating a configuration of the embodiment of the object recognition device according to the aspect of the present invention. As illustrated in FIG. 1, an object recognition device 10 includes a sensor input unit (object detection unit) 1, a coordinate specifying unit 2, a reliability setting unit 3, a distribution map creation unit 4, a region division unit 5, a point-to-point distance measurement unit 6, a grouping unit 7, and an object recognition unit (shape estimation unit) 8. The object recognition device 10 is installed on a vehicle as a part of a driving support system called a pre-crash safety system. Hereinafter, a vehicle in which the object recognition device 10 is installed will be referred to as a host vehicle.

The sensor input unit 1 detects an object present in the surrounding area of the host vehicle. The sensor input unit 1, for example, may be a sensor of any of a Light Detection And Ranging (LIDAR), a laser range finder, and a camera (stereo camera) or the like, however, hereinafter, it is a sensor that uses a laser ray.

The sensor input unit 1 has a laser ray transmission unit (transmission unit) 11 that transmits a plurality of laser rays so as to scan the surrounding area of the host vehicle, and reflected rays reception unit (reception unit) 12 that receives reflected rays of the laser rays transmitted from the laser ray transmission unit 11. The sensor input unit 1 detects the object present in the surrounding area of the host vehicle by the transmission of the laser rays from the laser ray transmission unit 11 and the reception of the reflected rays in the reflected ray reception unit 12.

A coordinate specifying unit 2 specifies the coordinates of the detection points of the object by the sensor input unit 1, based on the detection result of the sensor input unit 1. In the present embodiment, the detection points of the object by the sensor input unit 1 are the reflection points of the laser rays transmitted from the laser ray transmission unit 11. The coordinate specifying unit 2, for example, specifies the coordinates of the reflection points as the two-dimensional coordinates, in a case where the laser ray transmission unit 11 transmits a plurality of laser rays in a two-dimensional way.

The reliability setting unit 3 sets object presence reliability indicating the reliability of whether or not an object is present to the surrounding area of the host vehicle, based on the coordinates of the reflection points specified by the coordinate specifying unit 2. The object presence reliability, for example, can be set to three levels of "object present" in which a possibility of the presence of an object is high, "no object present" in which a possibility of the presence of an object is low, and "unknown" in which a possibility of the presence of an object is moderate.

The distribution map creation unit 4 creates a distribution map of the object presence reliability in the surrounding area of the host vehicle, based on the object presence reliability which is set by the reliability setting unit 3. The region division unit 5 divides the distribution map created by the distribution map creation unit 4 into a plurality of regions, if necessary.

The point-to-point distance measurement unit 6 measures the point-to-point distance indicating the distance between the reflection points, based on the coordinates of the reflection points specified by the coordinate specifying unit 2. For example, the measurement of the point-to point distance can be performed by using the distribution map created by the distribution map creation unit 4.

The grouping unit 7 groups the reflection points, based on the object presence reliability in the area between the reflection points. In the present embodiment, the grouping 7, in particular, groups the reflection points based on the distribution map. At that time, the grouping unit 7 groups a group of reflection points which meet predetermined criteria as a single group. The predetermined criteria, for example, may be that the point-to-point distance of the reflection points which are adjacent to each other is equal to or less than a predetermined distance or the like.

The object recognition unit 8 estimates a shape of the object corresponding to the grouped reflection points, based on the coordinates of the reflection points grouped by the grouping unit 7. The estimation of the shape of the object is performed in the area where the object presence reliability is equal to or greater than a predetermined threshold value (e.g., object presence reliability indicating "unknown"). In addition, the object recognition unit 8 recognizes an object based on the estimated shape.

Moreover, the coordinate specifying unit 2 to the object recognition unit 8 of the object recognition device 10 is configured to have a computer including CPU, ROM, and RAM or the like as a main body. Each function of the coordinate specifying unit 2 to the object recognition unit 8 is realized when running predetermined software in the computer thereof.

Figure 2:
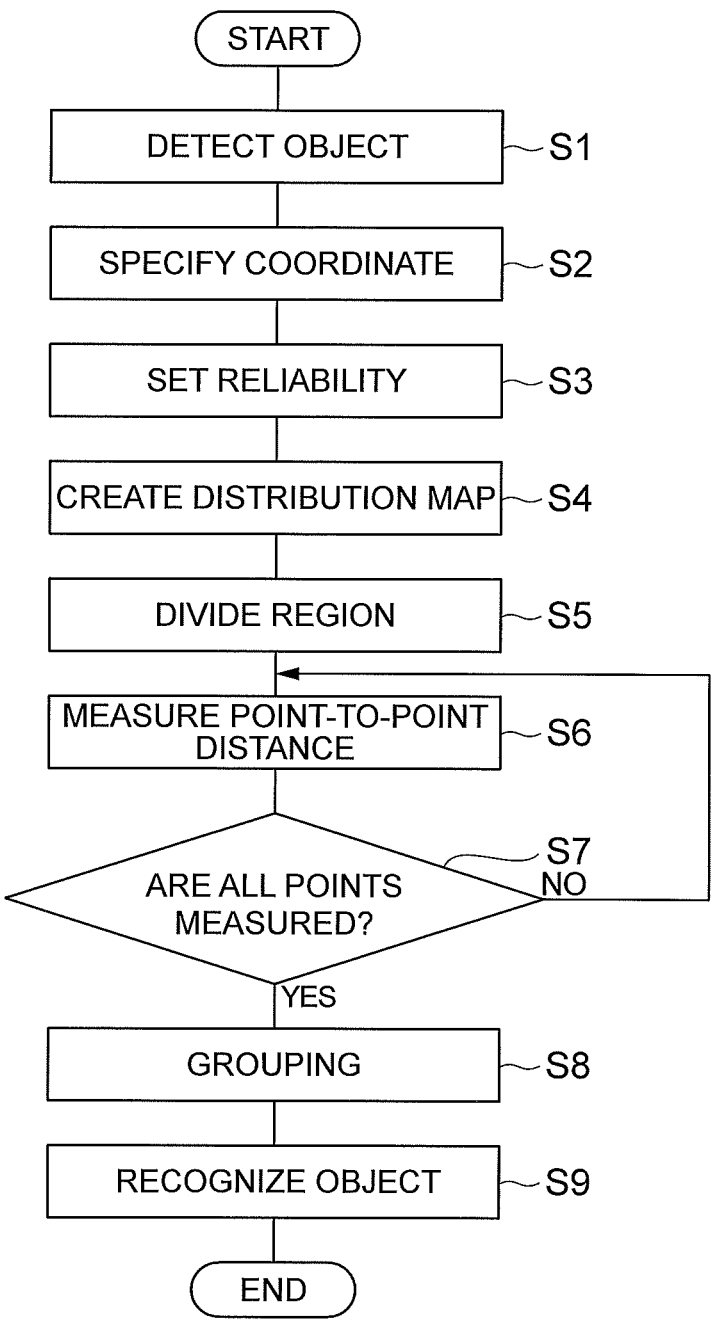
FIG. 2 is a flow chart showing an operation of the object recognition device illustrated in FIG. 1.

Next, operation of the object recognition device 10 will be described. FIG. 2 is a flow chart illustrating the operation of the object recognition device 10. As shown in FIG. 2, in the object recognition device 10, first, the sensor input unit 1 detects the objects present in the surrounding area of the host vehicle (step S1). More specifically, while the laser ray transmission unit 11 transmits laser rays to the surrounding area of the host vehicle, the sensor input unit detects the objects present in the surrounding area of the host vehicle when the reflected ray reception unit 12 receives the reflected rays.

Subsequently, the coordinate specifying unit 2 specifies the coordinates of the reflection points of the laser rays (step S2). Subsequently, the reliability setting unit 3 sets the object presence reliability indicating the reliability of whether or not an object is present to the surrounding area of the host vehicle (step S3). A setting of the object presence reliability by the reliability setting unit 3 will be described in detail.

Figure 3:
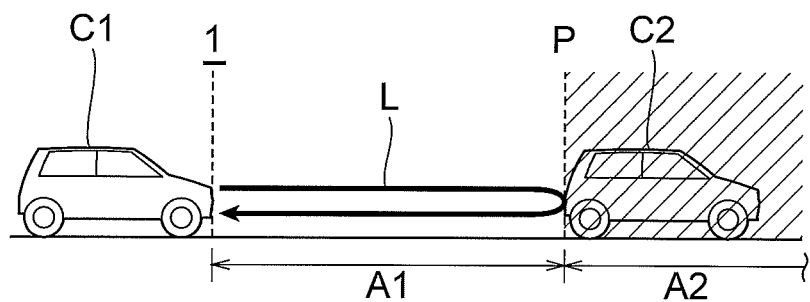
FIG. 3 is a schematic diagram illustrating a state of the setting of object presence reliability.

As illustrated in FIG. 3, the laser ray L transmitted from the sensor input unit 1 of a host vehicle C1, for example, in a case where the laser ray is received by the sensor input unit 1 after being reflected at a reflection point P of another preceding vehicle C2, sets the object presence reliability in an area A1 between the sensor input unit 1 and the reflection point P as "no object present", sets the object presence reliability in the reflection point P as "object present", and sets the object presence reliability in the area A2 which is ahead of the reflection point P as "unknown". That is, the reliability setting unit 3 sets the object presence reliability in area A1 between the sensor input unit 1 and the reflection point P to be lower than the object presence reliability in the reflection point P. Moreover, it is possible to set the area in which the reflection of the laser lays cannot be obtained as "no object present".

Figure 4:
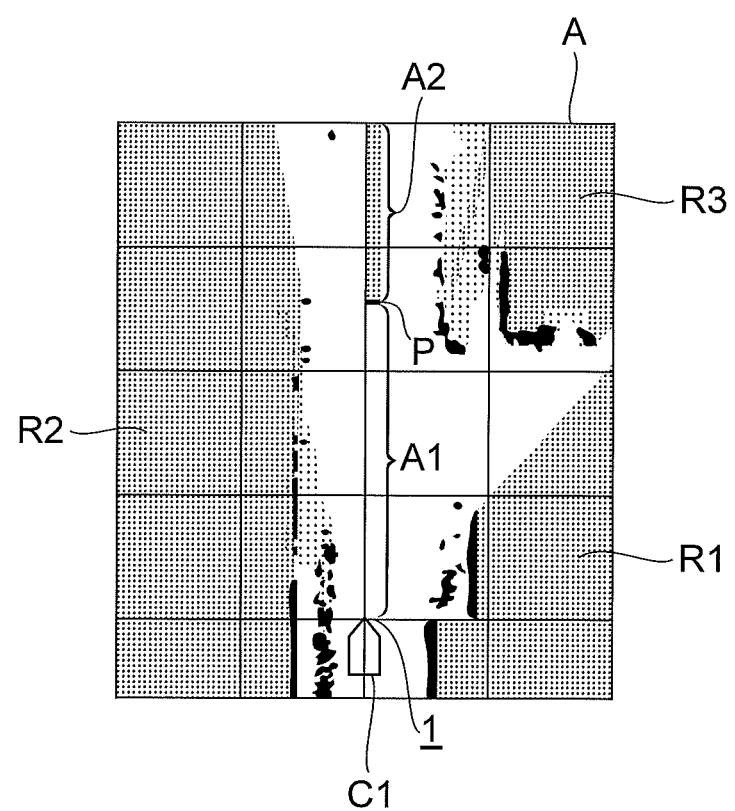
FIG. 4 is a view illustrating an example of a distribution map.

Subsequently, the distribution map creation unit 4 creates the distribution map of the object presence reliability in the surrounding area of the host vehicle, based on the object presence reliability set by the reliability setting unit 3 (step S4). FIG. 4 is a view illustrating an example of the distribution map created by the distribution map creation unit 4. As illustrated in FIG. 4, in a case where the laser ray transmission unit 11 transmits a plurality of laser rays two-dimensionally, in other words, in a case where the reflection points in a surrounding area A of the host vehicle C1 are arranged in two-dimensions, the distribution map creation unit 4 creates a two-dimensional map. In FIG. 3, as a region has higher object presence reliability, color is set darker.

As described above, the reliability setting unit 3 sets the object presence reliability in the area A1 between the sensor input unit 1 and the reflection point P of the host vehicle C1 as "no object present", and sets the object presence reliability in the reflection point P as "object present", and sets the object presence reliability in the area A2 which is ahead of the reflection point P as "unknown". The object presence reliability thereof is reflected in the distribution map. For this reason, in the distribution map, color is set darker in order of a region corresponding to the area A1, a region corresponding to area A2, and a region corresponding to the reflection point P.

Subsequently, the region division unit 5 divides the distribution map created by the distribution map creation unit 4 into a plurality of regions (step S5). More specifically, as illustrated in FIG. 4, the distribution map is divided into a region R1, a region R2, and a region R3. This, in the distribution map, is equivalent to considering the part in which the object presence reliability is equal to or greater than a predetermined threshold value and is continuous as a single region. Thus, when dividing the distribution map into the plurality of regions in advance, it is possible to avoid calculating the distance between the points to be described later and performing estimation or the like of the shape, between the regions indicating the objects which are clearly different.

Subsequently, the point-to-point distance measurement unit 6 measures the point-to-point distance indicating the distance between two reflection points which are adjacent to each other, based on the coordinates of the reflection points specified by the coordinate specifying unit 2 (step S6). The measurement of the point-to-point distance will be described more specifically.

Figure 5:
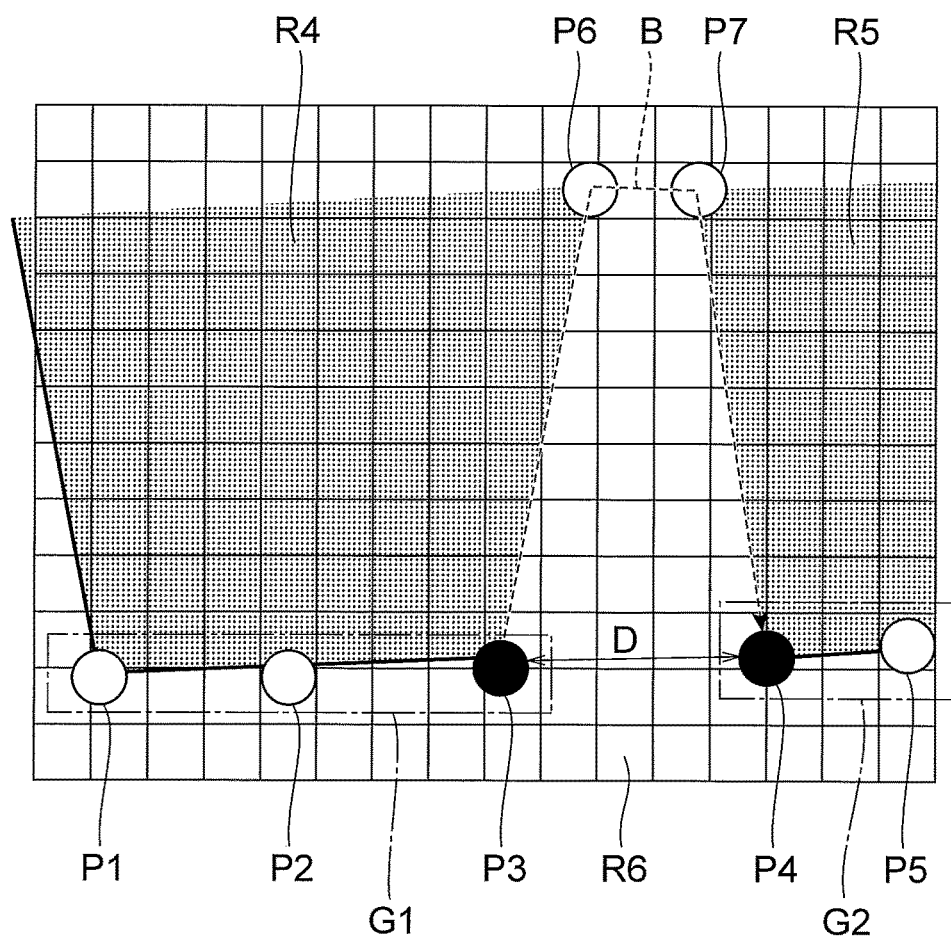
FIG. 5 is a view illustrating an example of the distribution map.

FIG. 5 is a view illustrating an example of the distribution map created by the distribution map creation unit 4. The distribution map is divided into a grid of a predetermined interval. In addition, in the distribution map, regions R4 and R5 which are set to gray are the regions in which the object recognition reliability is "unknown" and a region R6 is a region in which the object recognition reliability is "no object present". In addition, in the distribution map, the reflection points P1 to P7 are disposed.

The point-to-point distance measurement unit 6, for example, measures the point-to-point distance between two adjacent reflection points in the distribution map. More specifically, for example, the point-to-point distance is measured in order of the point-to-point distance between the reflection point P1 and the reflection point 2, and the point-to-point distance between the reflection point P2 and the reflection point P3. A region R6 in which the object presence reliability is "no object present" is set between the reflection point P3 and the reflection point P4. For this reason, the point-to-point measurement unit 6 measures the point-to-point distance between the reflection point P3 and the reflection point P4 as the distance of a path B passing through the reflection point P6 and the reflection point P7 while following the region R4 and the region R5. For this reason, the point-to-point distance between the reflection point P3 and the reflection point P4 is measured longer than an actual distance D.

In this manner, the point-to-point distance measurement unit 6 measures the point-to-point distance between the two reflection points, based on (considering) the object presence reliability in the area between the two reflection points which are adjacent to each other. More specifically, the point-to-point measurement unit 6 measures the point-to-point distance between the two reflection points in a region where the object reliability in the distribution map is less than a predetermined threshold value (e.g., the object reliability indicating "unknown"), considering that the object is not present. Moreover, in the measurement of the point-to-point distance, for example, an A*search algorithm can be used.

Subsequently, the object recognition device 10 determines whether or not the above measurement of the point-to-point distance is performed on all the reflection points (step S7). As a result of the determination, in a case where the measurement of the point-to-point distance is not performed on all the reflection points, the processing of the object recognition device 10 proceeds to step S6.

Meanwhile, as a result of the determination of step S7, in a case where the measurement of the point-to-point distance is performed on all the reflection points, the grouping unit 7 performs the grouping of the reflection points (step S8). The grouping can be performed based on the point-to-point distance measured by the point-to-point distance measurement unit 6. That is, the grouping can be performed on the basis that the point-to-point distance is equal to or less than a predetermined distance.

For example, as illustrated in FIG. 5, the reflection points P1 to P3 are considered as a single group G1 since the point-to-point distance between the points is short. In addition, the reflection point P4 and the reflection point P5 are also considered as a single group G2 since the point-to-point distance between the points is short. On the other hand, the reflection point P3 and the reflection point P4 are not considered as a single group since the point-to-point distance between the points is measured as the distance of the path B and the point-to-point distance thereof is long.

Subsequently, the object recognition unit 8 estimates the shape of an object corresponding to the grouped reflection points based on the coordinates of the reflection points grouped by the grouping unit 7, and then recognizes the object based on the estimated shape (step S9).

As described above, in the object recognition device 10, the reliability setting unit 3 sets the object presence reliability indicating the reliability of whether or not an object is present with respect to the surrounding area of the host vehicle. Then, the grouping unit 7 groups the reflection points, based on the object presence reliability in the area between the reflection points. More specifically, the grouping unit 7 groups the reflection points, based on the point-to-point distance in which the point-to-point distance measurement unit 6 measures considering the object reliability in the area between the reflection points.

For this reason, for example, even though two objects are adjacent to each other, in a case where the object presence reliability in the area between the reflection points of one object and the reflection points of the other object are low, the reflection points of the two objects can be separately grouped without being grouped into a single group. As a result, since it is possible to avoid mistakenly recognizing a plurality of objects as a single object, the recognition accuracy of the object can be improved.

In addition, in the object recognition device 10, the reliability setting unit 3 sets the object presence reliability in the area between the sensor input unit 1 and the reflection points to be lower than the object presence reliability in the reflection points. For this reason, the accuracy of the setting of the object presence reliability is improved.

In addition, in the object recognition device 10, the distribution map creation unit 4 creates the distribution map of the object presence reliability in the surrounding area of the host vehicle, based on the object presence reliability which is set by the reliability setting unit 3. Then, the grouping unit 7 performs grouping based on the distribution map created by the distribution map creation unit 4. More specifically, the grouping unit 7 performs the grouping, in the distribution map, based on the point-to-point distance measured by the point-to-point distance measurement unit 6. For this reason, it is possible to easily and reliably perform the grouping of the reflection points by using the distribution map.

In addition, in the object recognition device 10, the grouping unit 7 performs grouping in a region where the object presence reliability in the distribution map is less than a predetermined threshold value, considering that the object is not present. More specifically, the grouping unit 7 performs the grouping, based on the point-to-point distance measured by the point-to-point distance measurement unit 6, considering that the object is not present in a region where the object reliability in the distribution map is less than a predetermined threshold value. For this reason, it is possible to reliably avoid mistakenly recognizing a plurality of objects as a single object, and the recognition accuracy of the object can be further improved.

In addition, in the object recognition device 10, the object recognition unit 8 estimates the shape of the object in the area in which the object presence reliability is equal to or greater than a predetermined threshold value, based on the coordinates of the reflection points grouped by the grouping unit 7. For this reason, it is possible to more accurately perform object recognition based on the estimated shape.

In the above embodiments, one embodiment of the object recognition device according one aspect of the present invention is described, and the object recognition device according the aspect of the present invention is not limited to the object recognition device 10 described above. The object recognition device according to the aspect of the present invention may be a device which modifies the object recognition device 10 as desired without departing from the scope of the respective claims.

Figure 6:
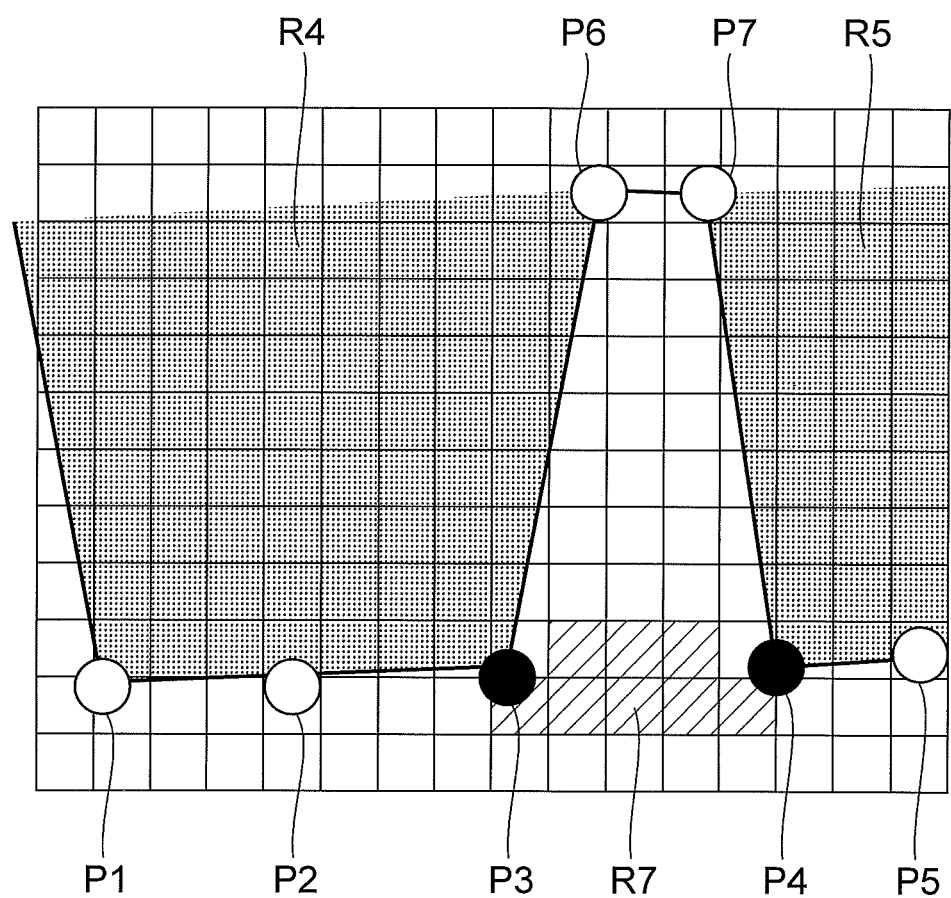
FIG. 6 is a view illustrating an example of the distribution map.

For example, measurement of the point-to-point distance in the point-to-point distance measurement unit 6 can be performed as follows. That is, as illustrated in FIG. 6, in a case where there is the region R7 in which the object presence reliability is "no object present" between the reflection point P3 and the reflection point P4, the point-to-point distance between the reflection point P3 and the reflection point P4 may not be estimated (e.g., invalid value is set). In this case, it is possible to decrease the load of the processing of determining a point-to-point distance.

In addition, the object presence reliability, may be continuous values, instead of three discontinuous values of "no object present", "object present", and "unknown" as described above.

In addition, it is possible to use a LIDAR as the sensor input unit 1. Since the LIDAR has two-dimensional coordinate analysis capability which is significantly higher compared to the laser radars in the related art, if using the LIDAR as the sensor input unit 1, the object recognition can be performed more accurately.

Further, the object recognition device 10 may be configured to not have the region division unit 5. In this case, high-accuracy recognition of an object can be achieved with a simple configuration.

INDUSTRIAL APPLICABILITY

It is possible to provide an object recognition device capable of improving the recognition accuracy of the object.

REFERENCE SIGNS LIST

1 . . . sensor input unit (object detection unit), 2 . . . coordinate specifying unit (coordinate specifying unit), 3 . . . reliability setting unit (reliability setting unit), 4 . . . distribution map creation unit (distribution map creation unit), 7 . . . grouping unit (grouping unit), 8 . . . object recognition unit (shape estimation unit), 10 . . . object recognition device, 11 . . . laser ray transmission unit (transmission unit), 12 . . . reflected ray reception unit (reception unit).

What is claimed is:
1. A vehicle comprising:
a sensor input unit including a Light Detection and Ranging (LIDAR) device, said LIDAR device includ- ing a laser ray transmission unit to transmit a plurality of laser rays so as to scan a surrounding area of the vehicle;

a laser ray reception unit to receive reflected laser rays from the surrounding area of the vehicle;

a coordinate specifying unit to specify coordinates of reflection points for said reflected laser rays;

a reliability setting unit to set object presence reliability values of whether an object is present in the surrounding area of the vehicle based on the coordinates of the reflection points specified by the coordinate specifying unit, said object presence reliability values being continuous values;

a distribution map creation unit to create a distribution map of the object presence reliability values in the surrounding area of the vehicle;

a region division unit to divide the distribution map into at least one region, wherein each region is an area of said distribution map having continuous object presence reliability values that are equal to or greater than a predetermined threshold value, and a grouping unit to group the coordinates of said reflection points based on object presence reliability in an area between said reflection points.

2. The vehicle of claim 1, wherein said grouping unit is to group the coordinates of said reflection points such that a group of reflection points is based on the distribution map.

3. The vehicle of claim 2, wherein said grouping unit is to group the coordinates of said reflection points such that a group of the coordinates meets a predetermined criteria where a point-to-point distance of adjacent reflection points is equal to or less than a predetermined distance.

4. The vehicle of claim 3, further comprising an object recognition unit to estimate a shape of an object corresponding to the group of coordinates from said grouping unit where the object presence reliability values are equal to or greater than a predetermined threshold value.

5. The vehicle of claim 4, wherein the object recognition unit is to recognize an object in the surrounding area of the vehicle based on the estimated shape of the object.

6. An object recognition device comprising:

a sensor input unit including a Light Detection and Ranging (LIDAR) device, said LIDAR device including a laser ray transmission unit to transmit a plurality of laser rays so as to scan a surrounding area of a vehicle;

a laser ray reception unit to receive reflected laser rays from the surrounding area of the vehicle;

a coordinate specifying unit to specify coordinates of reflection points for said reflected laser rays;

a reliability setting unit to set object presence reliability values of whether an object is present in the surrounding area of the vehicle based on the coordinates of the reflection points specified by the coordinate specifying unit, said object presence reliability values being continuous values;

a distribution map creation unit to create a distribution map of the object presence reliability values in the surrounding area of the vehicle;

a region division unit to divide the distribution map into at least one region, wherein each region is an area of said distribution map having continuous object presence reliability values that are equal to or greater than a predetermined threshold value, and a grouping unit to group the coordinates of said reflection points based on object presence reliability in an area between said reflection points.

7. The object recognition device of claim 6, wherein said grouping unit is to group the coordinates of said reflection points such that a group of reflection points is based on the distribution map.

8. The object recognition device of claim 7, wherein said grouping unit is to group the coordinates of said reflection points such that a group of the coordinates meets a predetermined criteria where a point-to-point distance of adjacent reflection points is equal to or less than a predetermined distance.

9. The object recognition device of claim 8, further comprising an object recognition unit to estimate a shape of an object corresponding to the group of coordinates from said grouping unit where the object presence reliability values are equal to or greater than a predetermined threshold value.

10. The object recognition device of claim 9, wherein the object recognition unit is to recognize an object in the surrounding area of the vehicle based on the estimated shape of the object.

11. A method of detecting an object in an area surrounding a vehicle comprising:

transmitting a plurality of laser rays from a Light Detection and Ranging (LIDAR) device of a sensor input unit so as to scan the surrounding area of the vehicle;

receiving reflected laser rays from the surrounding area of the vehicle;

specifying coordinates of reflection points for said reflected laser rays;

setting object presence reliability values of whether an object is present in the surrounding area of the vehicle based on the coordinates of the reflection points specified by the coordinate specifying unit, said object presence reliability values being continuous values;

creating a distribution map of the object presence reliability values in the surrounding area of the vehicle;

dividing the distribution map into at least one region, wherein each region is an area of said distribution map having continuous object presence reliability values that are equal to or greater than a predetermined threshold value, and grouping the coordinates of said reflection points based on object presence reliability in an area between said reflection points.

12. The method of claim 11, wherein said grouping the coordinates of said reflection points is performed such that a group of reflection points is based on the distribution map.

13. The method of claim 12, wherein said grouping the coordinates of said reflection points is performed such that a group of the coordinates meets a predetermined criteria where a point-to-point distance of adjacent reflection points is equal to or less than a predetermined distance.

14. The method of claim 13, further comprising:

estimating a shape of an object corresponding to the group of coordinates from said grouping operation where the object presence reliability values are equal to or greater than a predetermined threshold value.

15. The method of claim 14, further comprising:

recognizing an object in the surrounding area of the vehicle based on the estimated shape of the object.

* * * * *